United States Patent [19]

Miller et al.

[11] Patent Number: 4,844,849
[45] Date of Patent: Jul. 4, 1989

[54] METHOD OF MAKING EMBOSSED DECORATIVE SHEETS

[75] Inventors: Charles H. Miller, Lawrenceville; Robert D. Mansolillo, Bloomfield; Stanley J. Kaminski, Trenton; Susan G. Mushall, Columbus, all of N.J.

[73] Assignee: Congoleum Corporation, Lawrenceville, N.J.

[21] Appl. No.: 109,158

[22] Filed: Oct. 15, 1987

Related U.S. Application Data

[62] Division of Ser. No. 703,969, Feb. 21, 1985, abandoned.

[51] Int. Cl.$^4$ .............................................. B29C 67/22
[52] U.S. Cl. ................................. 264/46.4; 264/45.1; 264/DIG. 82
[58] Field of Search ............. 264/DIG. 82, 45.1, 46.4, 264/46.5

[56] References Cited

U.S. PATENT DOCUMENTS

| | | | |
|---|---|---|---|
| 3,293,094 | 12/1966 | Nairn et al. | 264/DIG. 82 |
| 3,373,072 | 3/1968 | Jones | 264/DIG. 82 |
| 3,464,934 | 9/1969 | Birkett et al. | 264/DIG. 82 |
| 3,819,438 | 6/1974 | Witman | 264/46.4 |
| 3,819,783 | 6/1974 | Jones | 264/52 |
| 4,113,487 | 9/1978 | Matsunaga et al. | 430/322 |
| 4,198,456 | 4/1980 | Adams et al. | 428/159 |
| 4,248,922 | 2/1981 | Shortway et al. | 264/DIG. 82 |
| 4,273,819 | 6/1981 | Schmidle et al. | 264/DIG. 82 |
| 4,277,427 | 7/1981 | Kaminski et al. | 264/DIG. 82 |

Primary Examiner—Jan H. Silbaugh
Assistant Examiner—Allan R. Kuhns
Attorney, Agent, or Firm—Alexis Barron

[57] ABSTRACT

A method of producing embossed decorative thermoplastic sheets by forming a laminate including a printable composition, having a relatively low viscosity and containing an effective amount of a blowing agent, between thermoplastic resin sheets. The printable composition is applied in a design pattern to a gelled thermoplastic resin on a support surface. A second layer of thermoplastic resin having a melt viscosity which differs from that of the first layer is applied to the printed first layer to form a composite structure. This structure is heated to decompose the blowing agent and effect foaming in selected portions of the resin layer having are established by the printed design pattern containing the blowing agent.

19 Claims, 2 Drawing Sheets

METHOD OF MAKING EMBOSSED DECORATIVE SHEETS

This is a division of co-pending application Ser. No. 703,969, filed on Feb. 21, 1985, now abandoned.

INTRODUCTION

The present invention is directed to a printable composition and processes for producing embossed decorative thermoplastic resin sheets therewith. More particularly, it relates to a printable composition containing a blowing agent applied between resin layers having a differential melt viscosity. The printable composition can be applied by conventional printing techniques including rotogravure printing to cause selective foaming within a thermoplastic resin material so as to create pleasing embossed textures and effects on the surface of a thermoplastic resin sheet.

The rotogravure printable composition and process of the present invention can also be employed advantageously to create a multi-layered embossing effect. In such an embodiment, one layer of embossing can be overlaid on another layer of embossing so that the upper layer would appear to be floating on top of the lower layer. Such an effect was not heretofore achievable by chemical embossing alone.

BACKGROUND OF THE INVENTION

Decorative and wear-resistance thermoplastic resin sheets have been used widely to provide protective coverings for floors, ceilings, walls, upholstery, automotive interiors, etc. As a result of popular demand, these thermoplastic sheets have often been provided with surface textural effects to simulate tiles, wood grain, bricks, and similar surfaces. These effects have been obtained by embossing, using mechanical or chemical techniques.

Mechanical embossing generally involves engraving a roll or plate, or otherwise treating its surface to create a desired design in raised relief. Then, either a thermoplastic sheet to be embossed or the embossing itself, or both, are heated and the embossing design is pressed into the softened thermoplastic resin sheet. Mechanical embossing in this manner has a number of disadvantages. Probably the greatest of these lies in the large capital expense and the difficulty of providing a uniform pressure along the length of an embossing roll or over the entire surface of an embossing plate. Therefore, this technique has generally has been limited to producing narrower thermoplastic resin sheets of up to twelve feet, the widest sheet commercially available. However, even in the mechanical embossing of narrower sheets, registery of the embossed design with the printed design has been a major problem requiring constant adjustment and resulting in considerable defective or out-of-registry products.

Chemical embossing techniques have become generally known since the issuance of U.S. Pat. Nos. 3,293,094 and 3,093,108 to Nairn, Harkins, Ehrenfeld and Tarlow on Dec. 20, 1966. The Nairn et al, references described a process in which a thermoplastic resin sheet is chemically embossed. The resin layer contains a chemical blowing agent, and the decomposition temperature of the blowing agent is altered by the selective printing of an inhibitor on its surface. The printed sheet is heated to a specific temperature range to decompose the blowing agent where no inhibitor is present. This results in differential foaming of the thermoplastic resin, producing depressed areas and raised areas. Since the inhibitor may easily be added to a pigment ink, the embossed effect can easily be registered in accordance with the printed pattern of the inhibitor and ink composition.

Another technique of chemical embossing is described in U.S. Pat. Nos. 3,464,934, 3,819,783, and 4,244,899. These references disclose a process in which the decomposition temperature of a chemical blowing agent is controlled by selectively applying an ink containing an activator to the surface of a foaming thermoplastic resin sheet. In this technique, subsequent heating is controlled at a lower temperature, so that areas of the foamable thermoplastic resin sheet in contact with the activator ink will foam to provide raised areas in accordance with the printed pattern of the activator and ink composition.

In these processes, a single foamable thermoplastic resin layer is provided. The bubbles in the foamed resin layer would tend to obscure any design lying beneath the foamed layer. If a second layer of embossing with different colors and designs is desired on top of the first layer, the second layer of foamable thermoplastic will obscure the design of the first layer when it is foamed. Therefore, multi-layer embossing has not been successfully achieved except by mechanical embossing or using a transfer sheet provided with a foamable plastisol, as described in Japanese Published Patent Application No. 47,065 of 1980. Mechanical embossing continues to suffer from the disadvantages described above, however, and embossing with transfer sheets involves increased process steps and expenses. Chemical embossing with a foamable plastisol is possible. But, because of the time required for the gelling of such plastisols, conventional high speed printing cannot be used. For example, if rotogravure printing with a plastisol were to be employed, the cell depth must be increased to 100 to 200 microns, and only 20–40 dots could be printed per linear inch since the thickness of the printed plastisol needs to be in the range of 0.02 to 0.06 mm. Moreover, the plastisol layer must be given time to gel before further processing can take place. Therefore, the speed of printing must be decreased, probably to as low as 30 feet per minute, to obtain acceptable results. Since conventional rotogravure printing is presently performed at speeds approaching 200 feet per minute, the slow speed of rotogravure printing with plastisols on a gelled base is impractical and unacceptable.

It is, therefore, an object of this invention to provide a printable composition which can be printed by conventional rotogravure apparatus and which will impart an embossed effect to thermoplastic resin sheets.

It is another objective to provide a process in which multi-layered chemical embossing is possible using conventional apparatus and process steps in order to avoid large capital expenses.

It is a further objective of the present invention to eliminate the need for mechanical embossing so that thermoplastic resin sheets can be provided in widths of up to fifteen feet or wider.

It is a further objective to provide thermoplastic resin sheets with multi-layered embossing effects.

SUMMARY OF THE INVENTION

In accordance with the present invention, a rotogravure printable composition is provided.

The printable composition comprises an effective amount of a blowing agent.

Optionally, the printable composition may also contain an accelerator for the blowing agent, a binder resin or a compatible solvent.

For use in rotogravure printing, the viscosity of the printable composition should be about 10 to about 50 seconds using a No. 3 Shell cup viscometer. The composition may also contain small amounts of other additives such as pigments, wetting agents, plasticizers, stabilizers, and the like.

The printable composition of the present invention is used to produce an embossed thermoplastic resin sheet. The process comprises:

(a) forming a first layer which comprises a gelled thermoplastic resin composition on a base web;

(b) applying a printable composition comprising an effective amount of a blowing agent to the surface of the gelled thermoplastic layer;

(c) applying a second layer of thermoplastic resin composition, which thermoplastic composition has a melt viscosity which differs from the melt viscosity of the thermoplastic resin composition of the first layer by at least 0.05 meter-kilograms to form a composite structure; and (d) heating the composite structure of step (c) to a sufficient temperature and for a sufficient period of time to gel the second resin layer.

The composite structure may subsequently be heated at sufficiently high temperature to fuse and decompose the blowing agent in the printable composition. Alternatively, the composite structure of step (c) may be heated to a sufficiently high temperature to fuse and decompose the blowing agent in the printable composition in a one step process.

Multi-layered embossing effects may be produced in the thermoplastic resin sheet by using the above process. For example, a third layer of thermoplastic resin with a low melt viscosity can be applied on top of the second thermoplastic resin layer. The third resin layer is gelled and printed with the printable composition according to the present invention in a different design. A fourth resin layer with a melt viscosity at least 0.05 meter-kilograms higher than the third resin layer is then applied and gelled. The composite can then be heated to fuse the resin layers and decompose the blowing agent in the printable composition layers to create multilayered embossing effects in the thermoplastic resin sheet. Alternatively, the process may be applied on top of an embossed thermoplastic sheet to create multi-layered embossing effects.

BRIEF DESCRIPTION OF THE DRAWINGS

In FIG. 1, a substrate (1) is coated with a first thermoplastic resin layer (2) and heated to gel the first thermoplastic resin layer. A printable composition (3) according to the present invention is applied on top of the gelled thermoplastic resin layer. A second thermoplastic resin layer (4) with a melt viscosity of about 0.20 to 1.30 meter-kilograms, about 0.05 meter-kilograms higher than the first thermoplastic layer is applied over the printed first thermoplastic resin layer.

FIG. 2 is a cross section of the thermoplastic covering sheet after heating to a temperature sufficient to decompose the blowing agent in the printable composition.

DETAILED DESCRIPTION OF THE INVENTION

Figure 1:
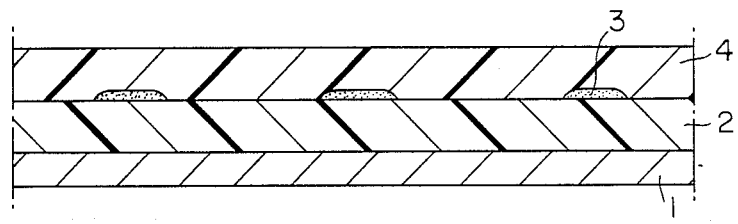
FIGS. 1 and 2 are cross sectional views of a portion of the thermoplastic resin sheet illustrating the steps of the process according to the present invention.
Figure 2:
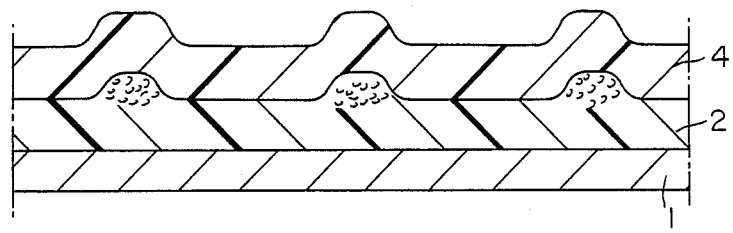
Figure 3:
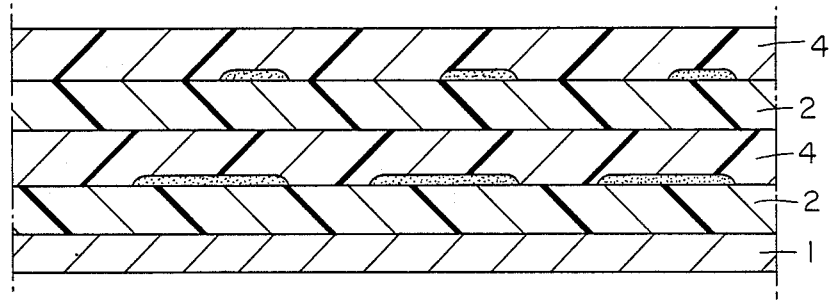
FIG. 3 and 4 illustrate a thermoplastic resin sheet with multi-layered embossing effects wherein both layers are embossed in accordance with the present invention.
Figure 4:
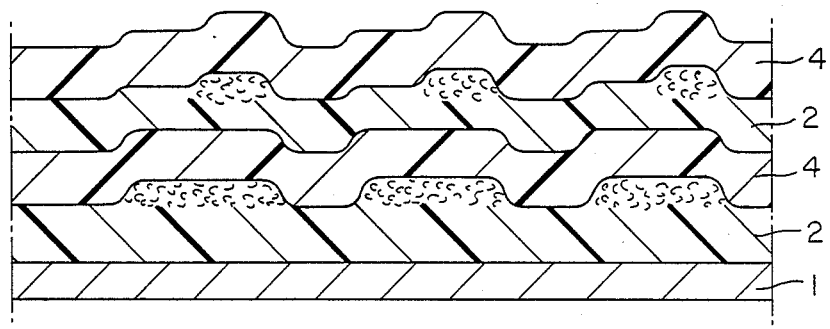
Figure 5:
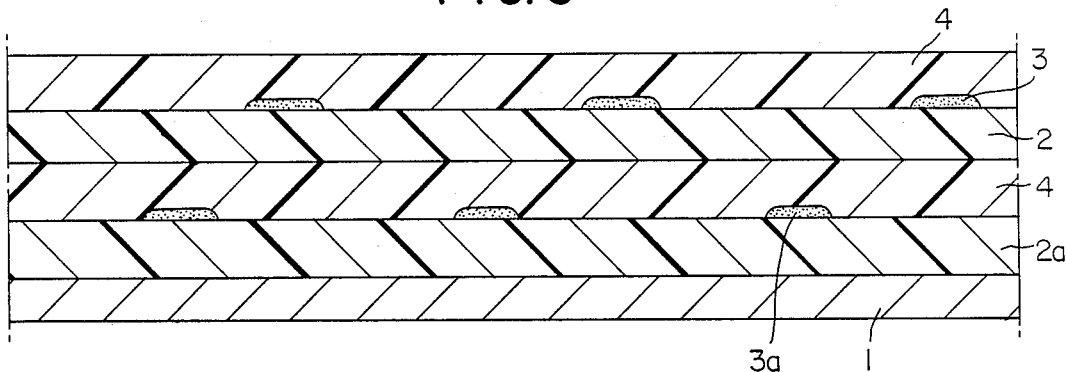
FIG. 5 and 6 illustrate a thermoplastic resin sheet with multi-layered embossing effects wherein the first layer is embossed in accordance with a conventional process and the second layer is embossed in accordance with the present invention.
Figure 6:
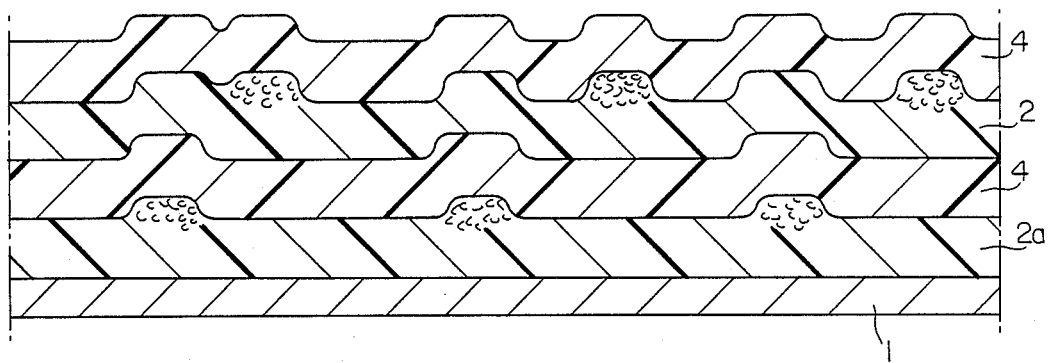

In accordance with the present invention, it has been discovered that embossing effects can be produced by selectively applying a chemical blowing agent in a printable composition between two layers of thermoplastic resin, wherein one of the layers has a melt viscosity of at least 0.05 meter-kilograms higher than the melt viscosity of the other layer.

The printable composition containing a chemical blowing agent is selectively applied to a first thermoplastic resin layer having a melt viscosity of between about 0.15 to about 0.85 meter-kilograms. The melt viscosity is measured in meter-kilograms by using a #6 head Brabender Torque Rheometer at 30 RPM and 177° C. with a 50 g. charge of the plastisol. The plastisol is introduced into the Brabender Torque Rheometer, the force required to shear the plastisol is measured as the plastisol is heated and fused. The force required to shear the plastisol after the plastisol has been tested for twenty minutes is the melt viscosity.

A second thermoplastic resin layer with a melt viscosity of at least about 0.05 meter-kilograms higher, preferably 0.2 meter-kilograms or higher is then applied on top of the first thermoplastic resin layer. The degree of desired embossing is related to the the amount of printable composition and the amount of heat applied.

Alternatively, the printable composition is applied selectively to a first thermoplastic resin layer having a melt viscosity between about 0.20 to about 1.3 meter-kilograms. A second thermoplastic resin layer with a lower melt viscosity at least 0.05 meter-kilograms lower is then applied over the first thermoplastic layer. When the composite structure so formed is heated, the thermoplastic layers are fused, the chemical blowing agent in the printable composition is decomposed and causes selective foaming in the thermoplastic resin layer with the lower melt viscosity. The selective foaming creates the embossed effect on the thermoplastic resin sheet.

Although only the chemical blowing agent is necessary in the practice of the present invention, the printable composition is normally applied as a solventized system, in a liquid carrier. For use in rotogravure printing, the printable composition should have a viscosity of about 10 to about 50 seconds using No. 3 Shell cup viscometer and comprises:

(a) an effective maount of a blowing agent;
(b) a binder resin;
(c) a solvent; and
(d) an effective amount of an accelerator for the blowing agent.

Blowing agents suitable for the present invention are well known in the art. The particular blowing agent selected usually depends on cost, the binder resin, the decomposition temperature of the blowing agent, and density and type of solvent desired. While many compounds decompose by giving off a gas, only a relatively few are produced commercially in quantity. Complex organic compounds which, when heated, decompose to yield an inert gas and leave residues which are compatible with the thermoplastic resin are preferred as blowing agents. Such materials have the property of decomposing over a narrow temperature range which is particularly desirable to obtain a good foam structure necessary to produce the desired embossing effect.

Typical blowing agents include substituted nitro compounds, such as p-toluene sulfonyl semicarbazide, azodicarbonamide, p,p'-oxybis-(benzene sulfonyl hydrazide), p,p'-oxybis-(benzene sulfonyl semicarbazide), azobisisobutyronitrile, N,N'-dimethyl-N,N'-dinitroso-terephthalate, diazoaminobenzene, N,N'-dinitrosos-pentamethylene-tetramine, aminoguanidine bicarbonate, p,p'-thio-bis-(benzene sulfonyl hydrazide), p,p'-diphenylmethane disulfonyl hydrazide, benzene m-disulfonyl hydrazide, benzene sulfonyl hydrazide, terephthalazide, benzazide, p-t-butyl benzazide, phthalazide, isophthalazide, 1,3-diphenyltriazene, azo-hexahydro-benzonitrile, azodicarboxylic acid diethylester, naphthalene-1,5-disulfonyl hydrazide and biuret. Of these, azodicarbonamide and p-toluene sulfonyl semicarbazide are preferred. p-Toluene sulfonyl semicarbazide, being available in the form a fine white powder, is particularly preferred when a clear or color stable pigmented printable composition is desired.

Inorganic blowing agents may also be used. These include ammonium bicarbonate, sodium bicarbonate, sodium boron hydride and silicon oxyhydride.

Blowing agents suitable for the present invention must be decomposed an effective amount at a temperature at which the thermoplastic layers are in a softened or slightly molten state and below the decomposition temperature of the thermoplastic resin used. As an illustration, with vinyl chloride polymers, a blowing agent decomposing between about 145° C. and about 235° C. can be used. In some instances, a combination of blowing agents may be used.

It is common practice to add accelerators or catalysts to the composition to accelerate the decomposition of the blowing agents, control the decomposition temperature and/or narrow the decomposition temperature range. Typical accelerators include organic, inorganic and organo metallic compounds, such as: dioctyl phthalate, dioctyl adipate, paraffin oil, calcium sulfate, magnesium sulfate, carbon black, stearic acid, barium stearate, stannous stearate, titanium oxide, citric acid, triethanol amine, dibutyl tin laurate, dibutyl tin bis isooctyl, thioglycolate, dibasic lead phosphite, dibasic lead stearate, dibasic lead phthalate and similar lead salts, zinc laurate, zinc oxide, zinc stearate, zinc carbonate, zinc octoate, zinc naphtholate, zinc dust and zinc mercapto-benzothiazole.

The printable composition containing the blowing agent usually contains a small amount of binder or carrier for the pigment, such as vinyl resin, and, in some cases, a plasticizer for the resin to give good adhesion to the printing surface. The binder or carrier is present in the printable composition in an amount of less than about 10% by weight, usually about 3% to about 8% by weight.

The printable composition containing the blowing agent may be dispersed in a solvent to provide a fluid with a viscosity in the range of about 10 to about 50 seconds as measured by the No. 3 Shell Cup Viscometer. This permits printing by conventional printing techniques such as silk screen, off-set or direct rotogravure printing. Rotogravure printing is preferred since this method permits a continuous process which is dependable and reproducible over a long period of time.

The printable composition containing the blowing agent is advantageously used to produce thermoplastic resin sheets having a textured or embossed surface. This is done by first applying a layer of thermoplastic resin to a base, heating the resin layer to yield a relatively solid and printable surface, and printing or otherwise applying on the surface of the gelled sheet the printable composition containing the blowing agent. Then a second thermoplastic resin layer is applied over the printing surface and the laminate or composite structure is heated to fuse the thermoplastic resin layers and decompose the blowing agent, causing selective foaming in the thermoplastic resin layer. It is important that the melt viscosities of the two thermoplastic layers be different, one layer having a melt visocsty of at least about 0.05 meter-kilograms, preferably at least 0.2 meter-kilograms, higher than the other layer. In this manner, when the blowing agent decomposes, it causes foaming in the layer with the lower melt viscosity producing a textured or embossed upper surface.

In a second embodiment, the process described above may be repeated to produce another laminate or composite structure over the first laminate or composite structure. If the printable composition containing the blowing agent is printed in the second laminate or composite structure in a different design from the first composite structure, interesting multi-layered embossed effects are achieved without the use of mechanical embossing and the problems associated therewith.

In another embodiment, the process described above to make the composite structure may be applied over a foamable thermoplastic resin layer to provide a soft and resilient, embossed thermoplastic resin sheet. The foamable thermoplastic resin layer may be treated with a printable composition containing either an inhibitor as in U.S. Pat. No. 3,293,094 or an activator as in U.S. Pat. No. 3,464,934. In this manner, a multi-layered embossed decorative sheet can be produced wherein one layer of embossed effect is observed as floating above or overlaid on another layer of embossed decorative effects.

Because the embossing is accomplished by the use of the blowing agent in the printable composition, the embossing is in complete registry with the printed design and out-of-registry problems associated with mechanical embossing are completely avoided. Further, the embossing according to the present invention is achieved by foaming selective areas of the thermoplastic resin layer, and not by differential foaming of a foamable resin layer. The process may be repeated over a lower layer without obscuring the design in the lower layer, an effect previously unachievable without the use of mechanical embossing.

Further, with the elimination of mechanical embossing, thermoplastic resin sheets with multi-layered embossed effects can be produced in much wider widths of up to about 15 feet without the expense problems associated with long calendaring or embossing rolls.

The process according to the present invention is applicable to any thermoplastic resin which may be preferably applied as a dispersion in a liquid medium or a calendared sheet. The dispersion medium can be water in the case of an aqueous latex, organic solvent as an organosol, or plasticizer as a plastisol.

Best results have been obtained with a plastisol. Plastisols are fluid at room temperature, but can be converted by heat to a fused, flexible, tough thermoplastic mass. Plastisols are preferred since it is unnecessary to remove large volumes of water as in latex or organic solvent as in an organosol. The thermoplastic resin layer may be applied as a dry blend of resin particles having plasticizers absorbed on their surface. The dry blend with the addition of stabilizers, pigments and the like can be mixed and distributed on a base in a smooth layer. The layer is then heated to either form a porous sheet or to fuse partially or completely into a solid sheet.

The preferred and most widely used resin for surface coverings are polymers of vinyl chloride. The vinyl chloride polymers can either be simple, unmixed homopolymers of vinyl chloride or copolymers, terpolymers or the like thereof in which the essential polymeric structure of polyvinyl chloride is interspersed at intervals with the residues of other ethylenically unsaturated compounds polymerized therewith. The essential properties of the polymeric structure of polyvinyl chloride will be retained if not more than about 40 percent of the extraneous comonomer is copolymerized therein. Suitable extraneous comonomers include, for instance, vinyl esters such as vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds such as vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3-piperylene, divinyl ketone and the like. Although such vinyl chloride resins are preferred, as is apparent, the compositions can be formed from any thermoplastic resin and the invention is not intended to be limited to any particular resin or group since many other types and groups of resins will occur to those skilled in the art and the particular resin selected does not form part of the invention. Other resins which can be mentioned, however, are polyethylene; polypropylene; methacrylate; synthetic rubber, such as neoprene, silicone, SBR and nitrile; polyurethanes; polyamides; polystyrene; phenolics, urea-formaldehydes; cellulose esters-epoxy and silicones.

Resins adaptable for use in formulating vinyl plastisols are commonly referred to as dispersion grade resins. Such resins are available having particle sizes of from about 0.02 to about 2 microns in contrast to calendar grade vinyl resins which are available in particle sizes ranging up to 35 microns or more. Dispersion grade resins are usually on higher molecular weight than calendar grade resins and have particle surfaces of a hard, horny nature. Compositions formulated from vinyl chloride having melt viscosities above about 0.15 meter-kilograms and preferably between 0.20 and 1.30 meter-kilograms are particularly effective. The melt viscosity, as noted previously, is measured as meter-kilograms using a 50g. sample tested for twenty minutes in a Brabender Torque Rheometer at 30 RPM and 177° C. The melt viscosity is an effective measure of relative molecular weight of the polymer, the higher the molecular weight the higher the melt viscosity.

In the formulation of plastisol compositions for use in the invention, the fine particle size resin is typically uniformly dispersed in a mass of fluid plasticizer. The fluidity of plastisols is influenced in part by the particular resin and plasticizers selected, but is also a function of the ratio of plasticizer to resin. Plastisols become less fluid as the ratio of plasticizer to resin is reduced. Thermoplastic resin compositions for use in the invention preferably may contain from about 20 to about 150 parts plasticizer per 100 parts resin with a range of about 50 to about 80 parts plasticizer per 100 parts resin being particularly effective. The viscosity of plastisol compositions can also be reduced by the addition of small amounts of a volatile diluent usually not exceeding about 10 parts per 100 parts resin. Useful diluents include benzene, toluene, petroleum solvents such as V. M. and P. naphtha (boiling range of 88°–135° C.) and the like. Organosols for use in the invention preferably contain about 20 to about 55 parts of plasticizer per 100 parts of resin with about 30 to 40 parts of plasticizer per 100 parts of resin being particularly preferred, whereas plastisols usually contain about 45 to about 150 parts of plasticizer per 100 parts or resin. The amounts of solvent utilized depends in large measure on the viscosity best suited for the apparatus utilized for applying the thermoplastic resin layer.

The selection of the plasticizer is important in determining the strength and flexibility of the thermoplastic resin layer and also in influencing the viscosity and viscosity stability of the composition. Esters of straight and branched chain alcohols with aliphatic acids impart low viscosity and good viscosity stability and foam stability. Typical plasticizers of this type include dibutyl sebacate, dioctyl sebacate, dioctyl adipate, didecyl adipate, dioctyl azelate, triethylene glycol di(2-ethylhexanoate), diethylene glycol dipelargonate, triethylene glycol dicaprylate, 2,2,4-trimethyl-1,3-pentanediol diisobutyrate, and the like. Plasticizers of the aromatic type, such as esters of aliphatic alcohols and aromatic acids or aromatic alcohols and aliphatic acids or aromatic acids or aromatic acid are desirable in that they impart good foaming characteristics to a plastisol, although the use of highly aromatic plasticizers is generally limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers such as esters of inorganic acids, including tricresyl phosphate, octyl diphenyl phosphate and the like, alkyd derivatives of rosin, chlorinated paraffins, high molecular weight hydrocarbon condensates and the like can also be used. The plasticizer or blend of plasticizers is chosen to yield a composition of the desired visocsty and/or foaming characteristics. In addition, the plasticizer should preferably have a low vapor pressure at the temperatures required to fuse the resin. A vapor pressure of two millimeters of mercury or less at 204° C. has been found particularly satisfactory.

Minor amounts of stabilizers are usually incorporated in the thermoplastic resin compositions to reduce the effects of degradation by light and heat. Suitable light stabilizers include phenyl phthalate, phenyl benzoate, o-tolyl benzoate, o-nitrophenol, and organic phosphates and other complexes of such metals as barium, cadmium, calcium, zinc, strontium, lead, tin and the like. Suitable heat stabilizers include sulfides and sulfites of aluminum, silver, calcium, cadmium, magnesium, cerium, sodium, strontium, and the like, leucine, alanine, o-and p-amino benzoic acid and weak acid radicals including recinoleates and abietates, octoates and stearates and the like. Normally, the compositions contain about 0.5 to about 5 parts stabilizer per 100 parts resin. The stabilizer in foamable compositions can exert an influence on the decomposition of the blowing agent in that some stabilizers will also serve as accelerators causing the decomposition of the blowing agent to take place at a lower temperature.

The thermoplastic resin compositions can contain pigments in accordance with the particular color desired. Any of the organic and inorganic pigments well known in the art for plastic compositions can be used. Normally, from about 0.5 to about 5 parts pigments per 100 parts resin are used.

The thermoplastic resin layer is usually applied over a backing web. The backing web utilized will depend in large measure on the product to be produced. If the backing web is to remain as part of the finished product, then it can be formed of a resinous composition, felt sheet, woven or knitted fabric or the like. Any of the thermoplastic or elastomeric resinous compositions which can be formed into a sheet can be used to form backing sheets for use in the invention. Typical of the resins which can be compounded with plasticizers and fillers and sheeted to form a sheet are such resins as butadiene styrene copolymers, polymerized chloroprene, polyvinyl chloride, polyvinyl acetate, vinyl chloride-vinyl acetate copolymers and the like. In some cases, scrap and degraded resinous compositions can be salvaged by forming them into sheets which can be used as backing sheets in producing products in accordance with the invention.

As indicated, suitable backing sheets also include woven fabrics formed of such fibers as cotton, wool, asbestos and various synthetic fibers. Where loosely woven fabrics such as burlap are used, the fabric can be sized to prevent passage of the coating composition through the openings between the fibers by utilizing the conventional sizing compositions used in the textile industry or a very viscous application of the thermoplastic resin composition which is to be applied. The thermoplastic resin can be dried or hardened quickly before it passes through the fabric.

Felted cellulose or mineral fiber sheets are particularly useful in accordance with the invention for producing products for use as surface coverings since they are low in cost and yet are flexible and strong. The sources of cellulose can include cotton or other rags, wood pulp, paper boxes, or mixtures thereof in any proportion. Asbestos has been the most commonly used mineral fiber, but its continued availability has become questionable for health reasons. Rock wool and glass fibers are typical mineral fiber substitutes which are now being employed commercially. A fibrous sheet is usually prepared by forming a slurry of fibrous material in water and then forming the slurry into a sheet using any of the techniques conventionally employed in the manufacture of paper. For example, sheet formation can take place on a Fourdrinier or cylinder sheet-forming machine. The fibrous sheet so prepared is then dried. In addition to cellulose and mineral fibers, other fibers can be used including fibers of synthetic and animal origin.

If the backing is to be removed from the final product, it is preferably a release paper. Such a paper conventionally has a coating on its surface to allow the plastic sheet to be easily stripped from the paper. Typical coatings used are clays, silicone compositions, polyvinyl alcohol, and similar special compositions well known in the art.

After the composite structure according to the present invention is prepared, it is heated to a temperature sufficient to gel and then to a sufficiently high temperature to fuse the resin and to decompose the blowing agent in the printable composition in a two step process or heated to a sufficiently high temperature to directly fuse the resin and to decompose the blowing agent in the printable composition in a one step process. The temperature of the entire mass of the composition upon the backing must attain the fusion temperature of the resin in order to obtain a product of maximum strength. Using the preferred vinyl resin described elsewhere, fusion is attained at an oven temperature of about 190° C. to about 220° C. In addition, the entire composite structure must be heated to a point where the blowing agent is decomposed. When the preferred high temperature blowing agent is used, foaming does not occur until the resinous composition has been fused. The heating must be carried out, however, at a temperature which allows decomposition of the blowing agent in the areas desired.

If volatile components are used in the compositions, care must be taken that they are substantially or completely removed from the composite structure prior to fusion. This can be accomplished by holding the composition at a temperature substantially below the fusion temperature and minimum decomposition temperature of the blowing agent for sufficient time to remove the volatile material. For example, if 5% of V. M. & P. naphtha (boiling range 88°–135° C.) is used, maintaining the composite at about 150° C. for 2 minutes will usually be sufficient to substantially remove sufficient volatile material. Fusion and blowing of the composite at about 205° C. can be accomplished with a good cell structure and freedom from blisters. The average size of the bubbles formed from the decomposition of the blowing agent are in the range of from 100 to 300 microns. Preferably, the bubbles are from about 150 to 250 microns and have a closed cell structure.

Heating for the purpose of fusing and foaming can be brought about in a forced hot air oven of the kind typically employed in the art. Other types of heating can be used, however. For example, the product can be passed beneath radiant heating elements. Alternately, di-electric heating can be employed.

After leaving the heating oven the embossed and fused product is typically permitted to cool. Care of the product until cooling is accomplished is particularly important to obtain a satisfactory product. Any premature handling immediately after foaming might cause partial collapse and distortion of the foam structure. Cooling can be brought about by mere exposure of the product to the atmosphere. Thus, the speed of motion of the backing along the processing apparatus and the spacing between the fusion oven and the end of the apparatus can be adjusted so that the product is given sufficient time to cool. Alternately, cooling can be accelerated by blowing jets of cooled air upon the fused and foamed composition or by means of fine sprays of water upon the fused and foamed composition or by utilizing cooling rolls.

After being cooled, the product is withdrawn from the processing apparatus. It can be used in the form of a sheet as produced or can be cut into tiles or other appropriate shapes depending on the particular use to which the product is to be put. Products produced in accordance with the invention have the characteristics of excellent texture, depending in part on the thickness of the foam layer. They are also characterized by having a marked three-dimensional textured appearance in perfect register with a printed design.

Further, if the product is provided with a layer of foamed structure with closed cells in accordance with the present invention, the product will have excellent resiliency. Still further, since the composite structure provides a clear thermoplastic resin layer with a high melt viscosity as the top layer, the product will have excellent wear resistance. If even better wear resistance is desired, the top layer may be a clear polyurethane resin layer or may be coated with a clear polyurethane resin layer.

The following examples illustrate the present invention.

EXAMPLE I

A fibrous felt sheet was coated uniformly with a 0.25 mm. layer of a liquid polyvinyl chloride plastisol with the following formulation:

|  | Parts by Weight |
| --- | --- |
| Dispersion Grade Polyvinyl Chloride Homopolymer (I.V. = 0.8) | 100 |
| Butyl Benzyl Phthalate | 25 |
| 2,2,4-Trimethyl-1,3-Pentanediol Diisobutyrate | 6 |
| Dodecyl Benzene | 8 |
| Epoxidized Tall Oil | 5 |
| Barium Zinc Phosphite | 3 |
| Titanium Dioxide | 5 |
| Calcium Carbonate | 30 |

The average melt viscosity of the plastisol composition was 0.24 meter-kilograms. The coated fibrous felt sheet was heated in a forced hot air oven at about 149° C. for 3 minutes to gel the polyvinyl chloride layer.

A printable composition was prepared as follows:

|  | % by weight |
| --- | --- |
| Polyvinyl Chloride-Vinyl Acetate (Solution Grade Resin) | 7% |
| Methyl Isobutyl Ketone | 65% |
| p-Toluene Sulfonyl Semicarbazide | 16% |
| 18% Zinc Octoate | 12% |
| Pigments | as needed |

The printable composition was applied in a design on the gelled polyvinyl chloride layer by conventional rotogravure techniques with cylinders engraved with a 120 lines per inch screen and a cell depth of 45 microns at a line speed of about 200 feet per minute.

A 0.25 mm. layer of polyvinyl chloride plastisol with the following composition was applied over the printed, gelled polyvinyl chloride layer to form a laminated composite structure.

|  | Parts by weight |
| --- | --- |
| Dispersion Grade Polyvinyl Chloride Homopolymer (I.V. = 1.4) | 89.0 |
| Suspension Grade Fine Particle Polyvinyl Chloride Homopolymer (I.V. = 0.9) | 11.0 |
| Butyl Benzyl Phthalate | 29.0 |
| 2,2,4-Trimethyl-1,3-Pentanediol Diisobutyrate | 6.9 |
| Dodecyl Benzene | 8.5 |
| Epoxidized Soya Oil | 5.0 |
| Barium Zinc Phosphite | 4.0 |

The average melt viscosity of the plastisol was 0.66 meter-kilograms.

The laminate was passed through a fusion oven at a temperature of 204° C. for about 2 minutes, then cooled to room temperature.

The thermoplastic sheet had an embossed appearance corresponding to the printed design. A cross section of the thermoplastic sheet under the magnifying glass showed that bubbles had formed below the interface of the two polyvinyl chloride layers in the lower melt viscosity layer.

EXAMPLE II

A fiber glass mat was saturated with a liquid polyvinyl chloride plastisol having the following composition.

|  | Parts by weight |
| --- | --- |
| Dispersion Grade Polyvinyl Chloride Homopolymer (I.V. = 0.8) | 89.0 |
| Suspension Grade Fine Particle Polvinyl Chloride Homopolymer (I.V. = 0.9) | 11.0 |
| Butyl Benzyl Phthalate | 25.0 |
| 2,2,4-Trimethyl-1,3-Pentanediol Diisobutyrate | 6.9 |
| Dodecyl Benzene | 8.5 |
| Epoxidized Soya Oil | 5.0 |
| Barium Zinc Phosphite | 4.0 |
| Titanium Dioxide | 5.0 |
| Calcium Carbonate | 30.0 |

The average melt viscosity of the polyvinyl chloride plastisol was 0.22 meter-kilograms.

The liquid polyvinyl chloride plastisol was heated in a forced hot air oven at 149° C. for about 3 minutes to gel the plastisol.

The gelled polyvinyl chloride plastisol was printed in a design by conventional rotogravure techniques using the following printable composition.

|  | % by weight |
| --- | --- |
| Polyvinyl Chloride-Vinyl Acetate Solution Grade Resin | 7% |
| Methyl Ethyl Ketone | 65% |
| p-Toluene Sulfonyl Semicarbazide | 16% |
| 18% Zinc Octoate | 12% |
| Pigments | as needed |

A 0.25 mm. layer of a liquid polyvinyl chloride plastisol was applied over the printed gelled layer to form a laminate. The composition of the liquid polyvinyl chloride plastisol was as follows:

|                                                    | Parts by weight |
|----------------------------------------------------|-----------------|
| Dispersion Grade Polyvinyl Chloride Homopolymer (I.V. = 1.4) | 89.0 |
| Suspension Grade Fine Particle Polyvinyl Chloride Homopolymer (I.V. = 0.9) | 11.0 |
| Butyl Benzyl Phthalate                             | 29.0 |
| 2,2,4-Trimethyl-1,3-Pentanediol Diisobutyrate      | 6.9  |
| Dodecyl Benzene                                    | 8.5  |
| Epoxidized Soya Oil                                | 5.0  |
| Barium Zinc Phosphite                              | 4.0  |

The average melt viscosity of the plastisol was 0.66 meter-kilograms.

The laminate was heated in a fusion oven at a temperature of about 204° C. for about 2 minutes and then cooled to room temperature.

The cooled laminated sheet was observed to have an embossed effect corresponding to the printed design. A cross section of the laminate was examined with a magnifying glass. Bubbles were observed below the interface between the first and second polyvinyl chloride layers beneath the printed design.

EXAMPLE III

A relatively flat 0.76 mm. thick continuous fibrous base layer or substrate comprised of cellulosic, inorganic, and organic fibers and fillers bound together by a resinous material was coated with a substantially uniform 0.25 mm. thick application of the following foamable polyvinyl chloride plastisol composition:

|                                                    | Parts by weight |
|----------------------------------------------------|-----------------|
| Dispersion Grade Polyvinyl Chloride Homopolymer (I.V. = 1.0) | 38.4 |
| Suspension Grade Fine Particle Polyvinyl Chloride Homopolymer (I.V. = 0.9) | 17.1 |
| Butyl Benzyl Phthalate                             | 15.4 |
| Alkyl Benzyl Phthalate                             | 9.3  |
| Dodecyl Benzene                                    | 7.4  |
| Dioctyl Phthalate                                  | 1.5  |
| Azodicarbonamide                                   | 1.1  |
| Accelerator/Stabilizer                             | 0.4  |
| Titanium Dioxide                                   | 2.5  |
| Wetting Agent                                      | as needed |
| Calcium Carbonate                                  | 6.9  |

The liquid foamable plastisol was gelled by exposure to 149° C. in a forced hot air oven, a temperature below the decomposition temperature of the azodicarbonamide blowing agent.

The foamable layer was then rotogravure printed with a terra cotta colored ink in a brick design with the following composition:

|                                                    | Parts by Weight |
|----------------------------------------------------|-----------------|
| Polyvinyl Chloride - Vinyl Acetate Copolymer Solution Grade Resin | 10% |
| Methyl Ethyl Ketone Solvent                        | 90% |
| Pigments                                           | as needed |

The mortar lines surrounding the bricks were rotogravure printed with a mortar colored ink containing a chemical foam inhibitor with the following composition:

|                                                    | Parts by Weight |
|----------------------------------------------------|-----------------|
| Polyvinyl Chloride - Vinyl Acetate Copolymer Solution Grade Resin | 9% |
| Methyl Ethyl Ketone Solvent                        | 81% |
| Trimellitic Anhydride                              | 10% |
| Pigments                                           | as needed |

A substantially uniform 0.25 mm. thick layer of a polyvinyl chloride plastisol was applied to the rotogravure printed foamable base. The average melt viscosity of the plastisol was 0.79 meter-kilograms. The composition of the plastisol was as follows:

|                                                    | Parts by Weight |
|----------------------------------------------------|-----------------|
| Dispersion Grade Polyvinyl Chloride Homopolymer (I.V. = 1.4) | 98.0 |
| Suspension Grade Polyvinyl Chloride Fine Particle Homopolymer (I.V. = 0.9) | 12.0 |
| Butyl Benzyl Phthalate                             | 29.0 |
| 2,2,4-Trimethyl-1,3-Pentanediol Diisobutyrate      | 7.0  |
| Dodecyl Benzene                                    | 8.5  |
| Epoxidized Soya Oil                                | 3.0  |
| Barium Zinc Phosphite                              | 4.0  |

The liquid plastisol coating was gelled and caused to become a solid layer by exposure to a temperature of 149° C. in a forced hot air oven.

The laminate was then printed by conventional rotogravure techniques with a design which appeared as small angular flakes. The rotogravure cylinder engraving was 120 cells per linear inch and the cell depth was 45 microns. The printable formulation was as follows:

|                                                    | Parts by Weight |
|----------------------------------------------------|-----------------|
| Polyvinyl Chloride - Vinyl Acetate Copolymer Solution Grade Resin | 7% |
| Methyl Ethyl Ketone                                | 65% |
| p-Toluene Sulfonyl Semicarbazide                   | 16% |
| 18% Zinc Octoate                                   | 12% |
| Pigments                                           | as needed |

A substantially uniform 0.13 mm. thick polyvinyl chloride plastisol layer was applied over the rotogravure printed flakes. This was a low melt viscosity layer with an average melt viscosity of 0.25 meter kilograms. The composition of this polyvinyl chloride plastisol was as follows:

|                                                    | Parts by Weight |
|----------------------------------------------------|-----------------|
| Dispersion Grade Polyvinyl Chloride Homopolymer (I.V. = 0.8) | 89.0 |
| Suspension Grade Fine Particle Polyvinyl Chloride Homopolymer (I.V. = 0.9) | 11.0 |
| Butyl Benzyl Phthalate                             | 25.0 |
| 2,2,4-Trimethyl-1,3-Pentanediol Diisobutyrate      | 6.9  |
| Dodecyl Benzene                                    | 8.5  |
| Epoxidized Soya Oil                                | 5.0  |
| Barium Zinc Phosphite                              | 4.0  |

The liquid plastisol coating was gelled and caused to become a solid layer by heating to a temperature of 149° C. in a forced hot air oven.

A second substantially uniform 0.13 mm. thick polyvinyl chloride plastisol coat was applied over the rotogravure printed flakes. This layer was a high melt viscosity layer with an average melt viscosity of 0.79 meter-kilograms and had the following composition:

|  | Parts by Weight |
|---|---|
| Dispersion Grade Polyvinyl Chloride Homopolymer (I.V. = 1.4) | 98.0 |
| Suspension Grade Fine Particle Polyvinyl Chloride Homopolymer (I.V. = 0.9) | 12.0 |
| Butyl Benzyl Phthalate | 29.0 |
| 2,2,4-Trimethyl-1,3-Pentanediol Diisobutyrate | 7.0 |
| Dodecyl Benzene | 8.5 |
| Epoxidized Soya Oil | 3.0 |
| Barium Zinc Phosphite | 4.0 |

The laminate was then exposed to an air temperature of 199° C. for about three and one half minutes in a forced hot air oven. The period of time and the temperature were sufficiently high to both fuse the polyvinyl chloride layers and cause the blowing agents to decompose.

The resulting sample resembled a conventional chemically embossed product with the terra cotta bricks embossed and the mortar line depressed. Additionally, the sample had the appearance of flake floating in the clear top resinous layer and had a surface texture corresponding to the presence of the flake. A closer examination with a magnifying glass revealed small foam bubbles appearing above the printed flake. A cross sectional examination showed that the bubbles were present only in the low melt viscosity layer and had not migrated into either of the adjacent high melt viscosity layers.

EXAMPLE IV

A relatively flat 0.76 mm. thick continous fibrous base layer or substrate comprised of cellulosic, inorganic, and organic fibers and fillers bound together by a resinous material was coated with a substantially uniform 0.25 mm. thick application of the following foamable polyvinyl chloride plastisol composition:

|  | Parts by Weight |
|---|---|
| Dispersion Grade Polyvinyl Chloride Homopolymer (I.V. = 1.0) | 38.4 |
| Suspension Grade Fine Particle Polyvinyl Chloride Homopolymer (I.V. = 0.9) | 17.1 |
| Butyl Benzyl Phthalate | 15.4 |
| Alkyl Benzyl Phthalate | 9.3 |
| Dodecyl Benzene | 7.4 |
| Dioctyl Phthalate | 1.5 |
| Azodicarbonamide | 1.1 |
| Accelerator/Stabilizer | 0.4 |
| Titanium Dioxide | 2.5 |
| Wetting Agent | as needed |
| Calcium Carbonate | 6.9 |

The liquid foamable plastisol was gelled and caused to become a solid layer by exposure to a temperature of 149° C. in a forced hot air oven, a temperature below the decomposition temperature of azodicarbonamide.

The foamable layer was then rotogravure printed with a terra cotta colored ink in a brick design with the following composition:

|  | Parts by Weight |
|---|---|
| Polyvinyl Chloride - Vinyl Acetate Copolymer Solution Grade Resin | 10% |
| Methyl Ethyl Ketone | 90% |

-continued

|  | Parts by Weight |
|---|---|
| Pigments | as needed |

The mortar line surrounding the brick design was rotorgravure printed with a mortar colored ink containing a chemical foam inhibitor with the following composition:

|  | Parts by Weight |
|---|---|
| Polyvinyl Chloride - Vinyl Acetate Copolymer Solution Grade Resin | 9% |
| Methyl Ethyl Ketone | 81% |
| Trimellitic Anhydride | 10% |
| Pigments | as needed |

A substantially uniform 0.13 mm. thick layer of a polyvinyl chloride plastisol was applied to the rotogravure printed potentially foamable base. This was a high melt viscosity resin with an average melt viscosity of was 0.79 meter-kilograms. The composition of the plastisol was as follows:

|  | Parts by Weight |
|---|---|
| Dispersion Grade Polyvinyl Chloride Homopolymer (I.V. = 1.4) | 98.0 |
| Suspension Grade Polyvinyl Chloride Fine Particle Homopolymer (I.V. = 0.9) | 12.0 |
| Butyl Benzyl Phthalate | 29.0 |
| 2,2,4-Trimethyl-1,3-Pentanediol Diisobutyrate | 7.0 |
| Dodecyl Benzene | 8.5 |
| Epoxidized Soya Oil | 3.0 |
| Barium Zinc Phosphite | 4.0 |

The liquid plastisol coating was gelled and caused to become a solid layer by exposure to a temperature of 149° C. in a hot air oven.

A substantially uniform 0.13 mm. thick polyvinyl chloride plastisol layer was applied over the rotogravure printed flake. This was a low melt viscosity layer with an average melt viscosity of 0.25 meter kilograms. The composition of this polyvinyl chloride plastisol was as follows:

|  | Parts by Weight |
|---|---|
| Dispersion Grade Polyvinyl Chloride Homopolymer (I.V. = .08) | 89.0 |
| Suspension Grade Fine Particle Polyvinyl Chloride Homopolymer (I.V. = .09) | 11.0 |
| Butyl Benzyl Phthalate | 25.0 |
| 2,2,4-Trimethyl-1,3-Pentanediol Diisobutyrate | 6.9 |
| Dodecyl Benzene | 8.5 |
| Epoxidized Soya Oil | 5.0 |
| Barium Zinc Phosphite | 4.0 |

The liquid plastisol coating was gelled and caused to become a solid layer by exposure to a temperature of 149° C.

The laminate was then printed by conventional rotogravure techniques with a design which appeared as small angular flakes. The rotogravure cylinder engraving was 120 cells per linear inch and the cell depth was 45 microns. The printable formulation was as follows:

|  | Parts by Weight |
| --- | --- |
| Polyvinyl Chloride - Vinyl Acetate Copolymer Solution Grade Resin | 7% |
| Methyl Ethyl Ketone | 65% |
| p-Toluene Sulfonyl Semicarbazide | 16% |
| 18% Zinc Octoate | 12% |
| Pigments | as needed |

A substantially uniform 0.25 mm. thick polyvinyl chloride plastisol layer was applied over the rotogravure printed flakes. This was a high melt viscosity layer with an average melt viscosity of 0.79 meter-kilograms. The composition was as follows:

|  | Parts by Weight |
| --- | --- |
| Dispersion Grade Polyvinyl Chloride Homopolymer (I.V. = 1.4) | 98.0 |
| Suspension Grade Fine Particle Polyvinyl Chloride Homopolymer (I.V. = .09) | 12.0 |
| Butyl Benzyl Phthalate Plasticizer | 29.0 |
| 2,2,4-Trimethyl-1,3-Pentanediol Diisobutyrate | 7.0 |
| Dodecyl Benzene | 8.5 |
| Epoxidized Soya Oil | 3.0 |
| Barium Zinc Phosphite | 4.0 |

The laminate was then heated to a temperature of 199° C. in a hot air oven for about 2 minutes. The temperature and time were sufficient to fuse the polyvinyl chloride layers and cause the blowing agents to decompose.

The resulting sample resembled a conventional chemically embossed product with embossed terra cotta bricks and depressed mortar lines. Additionally, the sample had the appearance of flake floating in the clear top resinous layer and had a surface texture corresponding to the presence of the flake. A cross sectional examination with a magnifying glass showed that the bubbles were present only in the low melt viscosity layer below the printed flake and had not migrated into either of the adjacent high melt viscosity layers.

EXAMPLE V

The base layer or substrate was a relatively flat 0.76 mm. thick continuous fiberous sheet of cellulosic, inorganic, and organic fibers and fillers bound together by a resinous material. The substrate was sized with a substantially uniform 0.13 mm. thick layer of a polyvinyl chloride plastisol of the following formulation:

|  | Parts by weight |
| --- | --- |
| Dispersion Grade Polyvinyl Chloride Homopolymer | 100 |
| Butyl Benzyl Phthalate | 25 |
| 2,2,4-Trimethyl-1,3-Pentanediol Diisobutyrate | 6 |
| Dodecyl Benzene | 8 |
| Epoxidized Tall Oil | 5 |
| Barium Zinc Phosphite | 3 |
| Titanium Dioxide | 5 |
| Calcium Carbonate | 30 |

Gelling and firming of the liquid size coat was accomplished in a forced hot air oven at an elevated temperature of about 149° C. for about three minutes. The sized substrate was then substantially uniformly coated with 0.13 mm. of the following polyvinyl chloride homopolymer plastisol:

|  | Parts by Weight |
| --- | --- |
| Dispersion Grade Polyvinyl Chloride Homopolymer (I.V. = 0.8) | 60 |
| Suspension Grade Fine Particle Polyvinyl Chloride Homopolymer (I.V. = 0.85) | 40 |
| Dioctyl Phthalate | 45 |
| Barium Zinc Phosphite | 4 |
| Epoxidized Soya Oil | 5 |

An excess of substantially flat approximately 0.25 mm. thick angular flake with a maximum width of about 2.67 mm. was applied to the wet plastisol coated substrate. The sheet proceeded at an upward angle and passed over a beater bar. The beater bar, a rotating shaft with protrusions, hit the sheet and because of gravity caused the unadhered flake to slide back down the sheet until they adhered. The flake employed here are of a polyvinyl chloride homopolymer composition as follows:

|  | Parts by Weight |
| --- | --- |
| Suspension Grade Polyvinyl Chloride Homopolymer (I.V. = 0.8) | 100.0 |
| Platy Talc | 50.0 |
| Dioctyl Phthalate | 32.5 |
| Butyl Benzyl Phthalate | 4.5 |
| Barium Zinc Phosphite | 4.0 |
| Epoxidized Soya Oil | 5 |
| Pigments and Opacifiers | as needed |

The above items were charged to a high intensity mixer with appropriate pigments and converted into a dry blend which was then calendared into a 0.25 mm. thick sheet and granulated into flakes. The flakes were then graded to accept those which passed through an 8 mesh screen and rejected those which passed through a 20 mesh screen. The flake were stored and different colors blended for application as described below.

The flake were formed into a substantially uniform layer by pressing them into the liquid adhesive plastisol between the heated platens of a hydraulic press with a force of about 140 pounds per square inch and a temperature of about 171° C. The heat and pressure cause the liquid plastisol to firm and become a gelled solid. The melt viscosity of the flake inlay layer was 0.50 meter-kilograms.

The substrate with the consolidated flake layer was then printed on a conventional rotogravure press. The printable composition used in the printing process has the following composition:

|  | % By Weight |
| --- | --- |
| Polyvinyl Chloride-Vinyl Acetate Solution Grade Resin | 7% |
| Methyl Ethyl Ketone Solvent | 65% |
| p-Toluene Sulfonyl Semicarbazide | 16% |
| 18% Zinc Octoate | 12% |
| Pigments | as needed |
| Titanium Dioxide | as needed |

The rotogravure cylinders were engraved with a 120 line per inch screen and a cell depth of 45 microns. Typical print line speeds of 200 feet per minute were attained by employing four feet of hot air dryers with an air temperature of approximately 93° C. A substantially uniform 0.25 mm. thick coat of a liquid polyvinyl chloride high melt viscosity homopolymer plastisol wearlayer with the following composition was applied to the printed inlaid substrate.

|  | Parts by Weight |
| --- | --- |
| Dispersion Grade polyvinyl Chloride Homopolymer (I.V. = 1.4) | 89.0 |
| Suspension Grade Fine Particle Polyvinyl Chloride Homopolymer (I.V. = 0.9) | 11.0 |
| Butyl Benzyl Phthalate | 29.0 |
| 2,2,4-Trimethyl-1,3-Pentanediol Diisobutyrate | 6.9 |
| Dodecyl Benzene | 8.5 |
| Epoxidized Soya Oil | 5.0 |
| Barium Zinc Phosphite | 4.0 |

The average melt viscosity of the polyvinyl chloride plastisol was 0.66 meter-kilograms. The laminated material was then passed through a fusion oven maintained at an elevated temperature of about 204° C. for an exposure time of about 2½ minutes. This operation fused the resins and caused the layers to become a viscous liquid, the high melt viscosity layer becoming much less fluid than the low melt viscosity flake inlay. The heat also caused the blowing agent to decompose and form bubbles. These bubbles occurred at or below the interface of the high and low melt viscosity layers without substantially disturbing the print quality. The bubbles beneath the printed design displaced the resinous material and caused an embossing effect to occur on the surface of the sheet.

EXAMPLE VI

A paper base coated with an acrylic/polyvinyl alcohol blend release layer is coated with a substantially uniform 0.38 mm. thick low melt viscosity polyvinyl chloride homopolymer opaque white plastisol with the following composition.

|  | Parts by Weight |
| --- | --- |
| Dispersion Grade polyvinyl Chloride Homopolymer (I.V. = 0.8) | 89.0 |
| Suspension Grade Fine Particle Polyvinyl Chloride Homopolymer (I.V. = 0.9) | 11.0 |
| Butyl Benzyl Phthalate | 25.0 |
| 2,2,4-Trimethyl-1,3-Pentanediol Diisobutyrate | 6.9 |
| Dodecyl Benzene | 8.5 |
| Epoxidized Soya Oil | 5.0 |
| Barium Zinc Phosphite | 4.0 |
| Titanium Dioxide | 5.0 |
| Calcium Carbonate | 30.0 |

Mineral Spirits was added as needed for viscosity control.

The average melt viscosity of the platisol was 0.22 meter-kilograms. The liquid base coat was heated in a forced hot air oven at an elevated temperature of about 149° C. for about three minutes. The substrate with the opaque white gelled polyvinyl chloride layer was then printed on a conventional rotogravure press with the following printable composition.

|  | % by weight |
| --- | --- |
| Polyvinyl Chloride - Vinyl Acetate Solution Grade Resin | 5% |
| Methyl Ethyl Ketone Solvent | 41% |

-continued

|  | % by weight |
| --- | --- |
| p-Toluene Sulfonyl Semicarbazide | 30% |
| 18% Zinc Octoate | 24% |
| Pigments | as needed |
| Titanium Dioxide | as needed |

A substantially uniform 0.25 mm. thick coat of a liquid polyvinyl chloride high melt viscosity homopolymer plastisol wearlayer with the following composition was applied to the printed substrate.

|  | Parts by Weight |
| --- | --- |
| Dispersion Grade Polyvinyl Chloride Homopolymer (I.V. = 1.4) | 89.0 |
| Suspension Grade Fine Particle Polyvinyl Chloride Homopolymer (I.V. = 0.9) | 11.0 |
| Butyl Benzyl Phthalate | 29.0 |
| 2,2,4-Trimethyl-1,3-Pentanediol Diisobutyrate | 6.9 |
| Butyl Benzene | 8.5 |
| Epoxidized Soya Oil | 5.0 |
| Barium Zinc Phosphite | 4.0 |

The average melt viscosity of the plastisol was 0.66 meter-kilograms. The laminated material was then passed through a fusion oven maintained at an elevated temperature of about 204° C. for an exposure time of about 2 minutes. This operation fused the resins and caused them to become a viscous liquid and caused the blowing agent to decompose. Bubbles from the decomposition of the blowing agent were observed beneath the printed design and an embossing effect was created on the surface of the sheet.

The finished material was stripped from the release paper, resulting in an unsupported nondimensionally stable flooring material.

EXAMPLE VII

A base layer or substrate, comprising a relatively flat 0.76 mm. thick continuous fiberous sheet of cellulosic, inorganic, and organic fibers and fillers bound together by a resinous material, was coated with a substantially uniform 0.25mm. thick layer of a low melt viscosity polyvinyl chloride plastisol of the following formulation:

|  | Parts by Weight |
| --- | --- |
| Dispersion Grade Polyvinyl Chloride Homopolymer (I.V. = 0.8) | 89 |
| Suspension Grade Fine Particle Polyvinyl Chloride Homopolymer (I.V. = 0.9) | 11 |
| Butyl Benzyl Phthalate | 25 |
| 2,2,4-Trimethyl-1,3-Pentanediol Diisobutyrate | 6.9 |
| Dodecyl Benzene | 8.5 |
| Epoxidized Tall Oil | 5 |
| Barium Zinc Phosphite | 4.0 |
| Titanium Dioxide | 5 |
| Calcium Carbonate | 30 |

Gelling and firming of the liquid coat was accomplished in a forced hot air oven at an elevated temperature of about 149° C. for about three minutes.

A 0.25 mm. thick high melt viscosity polyvinyl chloride homopolymer calendared wearlayer film was printed on a conventional rotogravure press with toned engraving using the following printable composition:

|  | % by weight |
| --- | --- |
| Polyvinyl Chloride - Vinyl Acetate Solution Grade Resin | 7% |
| Methyl Ethyl Ketone Solvent | 65% |
| p-Toluene Sulfonyl Semicarbazide | 16% |
| 18% Zinc Octoate | 12% |
| Pigments | as needed |
| Titanium Dioxide | as needed |

The rotogravure printed calendered wearlayer was then laminated to the gelled white opaque low melt viscosity polyvinyl chloride coated base. The base was passed under an infrared heater and preheated to a surface temperature of about 177° C. The calendered film was then mated to the substrate so that the printed side of the film was in contact with the white polyvinyl chloride side of the base as the sheets enter the nip of a planisher with a smooth steel top roll heated to about 177° C. and an ambient temperature hard rubber surfaced bottom roll. While passing through the planisher with a nip pressure of about 150 pounds per linear inch at a speed of about 25 feet per minute, the printed high melt viscosity calendered wearlayer was laminated to the white low melt viscosity polyvinyl chloride coated base.

The material was then passed through a fusion oven maintained at an elevated temperature of about 204° C. for an exposure time of about 2 minutes. This operation fused the resins and caused the blowing agent to decompose and create bubbles associated with a foam. The bubbles displaced the resinous material creating an embossed effect on the surface of the sheet. Furthermore, there appeared to be a direct relationship between the height of the embossing and the amount of foamable ink printable composition applied.

EXAMPLE VIII

A base layer or substrate, comprising a relatively flat 0.76 mm. thick continuous fiberous sheet of cellulosic, inorganic, and organic fibers and fillers bound together by a resinous material, was coated with a substantially uniform 0.25 mm. thickness of a low melt viscostity polyvinyl chloride plastisol of the formulation:

|  | Parts by Weight |
| --- | --- |
| Dispersion Grade Polvinyl Chloride Homopolymer (I.V. = 0.8) | 100 |
| Butyl Benzyl Phthalate | 25 |
| 2,2,4-Trimethyl-1,3-Pentanediol Diisobutyrate | 6 |
| Dodecyl Benzene | 8 |
| Epoxidized Tall Oil | 5 |
| Barium Zinc Phosphite | 3 |
| Titanium Dioxide | 5 |
| Calcium Carbonate | 30 |

The average melt viscosity of the plastisol was 0.24 meter-kilograms.

Gelling of the plastisol was accomplished in a forced hot air oven at an elevated temperature of about 149° C. for about three minutes.

The substrate with the opaque white gelled polyvinyl chloride layer is then printed on a conventional rotogravure press with the following aqueous based printable composition in a quarry tile design:

|  | Parts by weight |
| --- | --- |
| Acrylic Thermoplastic Emulsion | 30 |
| Zinc Stearate | 16 |
| p-Toluene Sulfonyl Semicarbazide | 16 |
| Wetting Agent | 5 |
| Water | 33 |

A substantially uniform 0.25 mm. thick coat of a liquid polyvinyl chloride high melt viscosity homopolymer plastisol wearlayer with the following composition was applied to the printed substate.

|  | Parts by weight |
| --- | --- |
| Dispersion Grade polyvinyl Chloride Homopolymer (I.V. = 1.4) | 89.0 |
| Suspension Grade Fine Particle Polyvinyl Chloride Homopolymer (I.V. = 0.9) | 11.0 |
| Butyl Benzyl Phthalate | 29.0 |
| 2,2,4-Trimethyl-1,3-Pentanediol Diisobutyrate | 6 |
| Dodecyl Benzene | 8.5 |
| Epoxidized Soya Oil | 5.0 |
| Barium Zinc Phosphite | 4.0 |

The laminate material was then passed through a fusion oven maintained at an elevated temperature of about 204° C. for an exposure time of about 2 minutes. This operation fused the resins and caused the blowing agent to decompose and create bubbles associated with a foam. The bubbles displaced the resinous material creating an embossed effect on the surface of the sheet. This resulted in an embossed quarry tile design with depressed mortar lines.

EXAMPLE IX

A base layer or substrate, comprising a relatively flat 0.76 mm. thick continuous fiberous sheet of cellulosic, inorganic, and organic fibers and fillers bound together by a resinous material, was coated with a substantially uniform 0.25 mm. thick layer of a low melt viscosity polyvinyl chloride plastisol with the following formulation:

|  | Parts by weight |
| --- | --- |
| Dispersion Grade Polyvinyl Chloride Homopolymer (I.V. = 0.8) | 100 |
| Butyl Benzyl Phtalate | 25 |
| 2,2,4-Trimethyl-1,3-Pentanediol Diisobutyrate | 6 |
| Dodecyl Benzene | 8 |
| Epoxidized Tall Oil | 5 |
| Barium Zinc Phosphite | 3 |
| Titanium Dioxide | 5 |
| Calcium Carbonate | 30 |

The average melt viscosity of the plastisol was 0.24 meter-kilograms. Gelling and firming of the liquid coat was accomplished in a force hot air oven at an elevated temperature of about 149° C. for about three minutes.

A paper base coated with a thin film of polypropylene with a matte finish was printed on a conventional rotogravure press with printable compositions of the following formulations:

|  | Parts by weight | |
| --- | --- | --- |
|  | No. 1 | No. 2 |
| Polyviny Chloride - Vinyl Acetate Solution Grade Resin | 7% | 7% |
| Methyl Ethyl Ketone Solvent | 65% | 78% |
| p-Toluene Sulfonyl Semicarbazide | 16% | — |
| 18% Zinc Octoate | 12% | — |
| Fumaric Acid | — | 13% |
| Pigments | as needed | as needed |
| Titanium Dioxide | as needed | as needed |

The printable compositions were printed in reverse order with formulation No. 1 in the shape of terra cotta bricks and formulation No. 2 printed as mortar lines and imperfections in the bricks. The rotogravure cylinders were engraved with 120 line per inch screen and a cell depth of 45 microns. Typical printing speeds of 200 feet per minute were attained by employing four feet of hot air dryers with an air temperature of approximately 93° C.

The rotogravure printed design was transferred to the gelled white opaque low melt viscosity polyvinyl chloride coated base. The printed matte finished polypropylene coated paper was mated to the substrate so that the printed side of the paper was in contact with the white polyvinyl chloride side of the base as the sheets enter the nip of a planisher with a top smooth steel roll heated to about 149° C. and an ambient temperature hard rubber surfaced bottom roll. After passing through the planisher with a nip pressure of about 45 pounds per linear inch at a speed of about 40 feet per minute, the paper with polypropylene film was separated from the white low melt viscosity polyvinyl chloride coated base leaving the print intact on the surface of the substrate.

A substantially uniform 0.25 mm. thick coat of a liquid polyvinyl chloride high melt viscosity homopolymer plastisol wearlayer with the following formulation was applied to the printed substrate. The average melt viscosity of plastisol wear layer was 0.66 meter-kilograms.

|  | Parts by weight |
| --- | --- |
| Dispersion Grade polyvinyl Chloride Homopolymer (I.V. = 1.4) | 89.0 |
| Suspension Grade Fine Particle Polyvinyl Chloride Homopolymer (I.V. = 0.9) | 11.0 |
| Butyl Benzyl Phthalate | 29.0 |
| 2,2,4-Trimethyl-1,3-Pentanediol Diisobutyrate | 6.9 |
| Dodecyl Benzene | 8.5 |
| Expoxidized Soya Oil | 5.0 |
| Barium Zinc Phosphite | 4.0 |

The material then passes through a fusion oven maintained at an elevated temperature of about 204° C. for an exposure time of about 2 minutes. This operation fused the resins and caused them to become a viscous liquid. The high melt viscosity wearlayer became much less fluid than the low melt viscosity opaque white base coat. The heat also caused the blowing agent to decompose and create the bubbles associated with a foam. These bubbles occurred at or below the interface of the high and low melt viscosity layers. This resulted in a raised terra cotta brick set in a debossed gray mortar line. In addition, the surface of the bricks was debossed where the inhibitor ink, formulation No. 2, had been printed to simulate brick imperfections.

The above examples are presented to illustrate the invention and are not construed as limiting the scope of the present invention.

What is claimed is:

1. A process for producing a thermoplastic resin sheet comprising the following steps:
   a. forming a first layer which comprises a gelled thermoplastic resin composition on a support surface;
   b. providing a printable composition comprising an effective amount of a blowing agent and having a viscosity such that said composition is capable of being printed by high speed rotogravure printing and applying in a design pattern said composition to the surface of the gelled thermoplastic resin layer by high speed rotogravure printing;
   c. forming a composite structure by applying to said printed resin layer a second layer of thermoplastic resin composition which has a melt viscosity which differs from the melt viscosity of the thermoplastic resin composition of the first layer by at least 0.05 meter-kilogram; and
   d. heating the composite structure of step (c) to a sufficient temperature and for sufficient period of time to fuse the resin layers and to decompose the blowing agent in the printable composition, thereby effecting foaming in the resin layer which has the lower melt viscosity.

2. A process according to claim 1 further comprising heating the composite structure of step (c) to a sufficient temperature and for sufficient period of time to gel the second resin layer prior to heating the composite structure according to step (d).

3. A process according to claim 1 or 2 wherein the second resin layer has a lower melt viscosity than the first resin layer and foaming is effected in said second resin layer.

4. A process according to claim 1, wherein the thermoplastic resin of the first layer in a vinyl polymer with a melt viscosity of about 0.15 meter-kilograms to about 0.75 meter-kilograms and the thermoplastic resin of the second layer is a vinyl polymer with a different melt viscosity, wherein the melt viscosities of the two layers is different by at least 0.05 meter-kilograms.

5. A process according to claim 1 wherein the melt viscosities of the two thermoplastic layers differ by at least 0.2 meter kilograms.

6. A process according to claim 2 in which the melt viscosity of the first layer of gelled thermoplastic resin composition is about 0.15 to about 0.85 meter-kilogram and the melt viscosity of the second layer is at least 0.05 meter-kilogram higher than that of the first layer, and including also: prior to step (d) applying a third layer of thermoplastic resin composition with a melt viscosity of about 0.15 to about 0.85 meter-kilogram over the gelled second resin layer; heating to gel the third thermoplastic resin layer; applying to the gelled third layer in a design pattern different from that of the design pattern of step (b) by high speed rotogravure printing a second printable composition comprising an effective amount of a blowing agent and having a viscosity such that said composition is capable of being printed by high speed rotogravure printing; and applying thereto a fourth layer of a thermoplastic resin composition with a melt viscosity at least 0.05 meter-kilogram higher than that of the third thermoplastic resin layer; and wherein step (d) includes heating the resulting structure to fuse each of the resin layers and to decompose each of the blowing agents.

7. A process according to claim 1 in which said support surface is prepared by:
   A. forming a first ply of a gelled foamable thermoplastic resin composition containing a blowing agent on a backing web;
   B. applying a first printable composition in a desired design to the surface of the gelled foamable thermoplastic resin of the first ply, which first printable composition contains an effective amount of an inhibitor, to form a first printed resin ply;
   C. applying a second ply of thermoplastic resin, which resin has a melt viscosity in the range of about 0.20 to about 1.30 meter-kilograms, to the surface of the first printed resin ply to form a first printed composite;
   D. heating the first printed composite to a temperature and for a time period sufficient to gel the second ply of thermoplastic resin to form said support surface and without decomposing the blowing agent in the foamable composition of step A. above; and
   wherein said first layer of gelled thermoplastic resin composition which is formed on said support surface in accordance with step (a) has melt viscosity of between 0.15 to 0.85 meter-kilogram; and wherein the second layer of thermoplastic resin composition formed in accordance with step (c) has a melt viscosity of between 0.20 to about 1.30 meter-kilograms and is at least 0.05 meter-kilograms higher than the melt viscosity of the thermoplastic resin of the first layer; and
   e. heating the resulting structure to fuse each of the resin plies and layers and to decompose each of the blowing agents.

8. A process according to claim 1 in which said support surface is prepared by:
   A. forming a first ply of gelled foamable resin composition containing a blowing agent on a base web;
   B. applying a first printable composition in a desired design to the surface of the gelled foamble thermoplastic resin ply, which first printable composition contains an effective amount of an inhibitor, to form a first printed resin ply;
   C. applying a second ply of thermoplastic resin having a melt viscosity of at least 0.05 meter-kilogram higher than the melt viscosity of the resin of the first ply to the printed surface of the first ply to form a first printed composite;
   D. heating the first printed composite to a temperature and for a time period sufficient to gel the second ply of thermoplastic resin to form said support surface and without decomposing the blowing agent in the foamable composition of step A. above; and
   wherein the thermoplastic resin composition of said first layer which is formed on said support surface in accordance with step (a) has a melt viscosity of at least 0.05 meter-kilogram lower than the melt viscosity of the thermoplastic resin composition of the second ply; and where the second layer of thermoplastic resin composition formed in accordance with step (c) has a melt viscosity of at least 0.05 meter-kilogram higher than the melt viscosity of that of the first layer; and
   e. heating the resulting structure to fuse each of the resin plies and layers and to decompose each of the blowing agents.

9. A process according to claim 6 further comprising heating the resulting structure to a sufficient temperature and for a sufficient period of time to gel the fourth resin layer prior to heating it to fuse said resin layers and decompose said blowing agents.

10. A process according to claim 7 or 8 further comprising heating the resulting structure to a sufficient temperature and for sufficient period of time to gel the second resin layer prior to heating it to fuse said resin plies and layers and to decompose the blowing agents.

11. A process according to claims 6, 7 or 8 wherein at least one thermoplastic resin composition is a thermoplastic vinyl resin.

12. A process according to claims 6, 7 or 8 wherein each of the blowing agents is p-toluene sulfonyl semicarbazide.

13. A process according to claims 6, 7 or 8 wherein each of the blowing agents is azodicarbonamide.

14. A process according to claim 1, 6, 7 or 8 wherein each of the thermoplastic resins is a vinyl resin and wherein the temperature for gelling the vinyl resin is about 140° C. to 160° C. and gelling the vinyl resin by heating to a temperature of about 140° C. to 160° C.

15. A process according to claim 1, 6, 7 or 8 including effecting said fusion and decomposing the blowing agent by heating to about 190° C. to 210° C.

16. A process according to claim 13 including effecting said fusion and decomposing the blowing agent by heating to about 190° C. to 210° C.

17. A process according to claim 1, 6, 7 or 8
   wherein each printable composition containing said effective amount of blowing agent is free of plasticizer.

18. A process according to claim 1, 6, 7, 8 or 17 wherein the viscosity of each printable composition containing the blowing agent is about 10 to about 50 seconds.

19. A process according to claim 1 or 2 wherein the first resin layer has a lower melt viscosity than the second resin layer and foaming is effected in said first resin layer.

* * * * *